(12) United States Patent  
Jung et al.

(10) Patent No.: US 7,592,096 B2  
(45) Date of Patent: Sep. 22, 2009

(54) LITHIUM ION SECONDARY BATTERY

(75) Inventors: Sang-Sok Jung, Youngin-si (KR); Se-Yun Kim, Youngin-si (KR)

(73) Assignee: Samsung SDI Co., Ltd., Suwon-si, Gyeonggi-Do (KR)

( * ) Notice: Subject to any disclaimer, the term of this patent is extended or adjusted under 35 U.S.C. 154(b) by 698 days.

(21) Appl. No.: 11/250,619

(22) Filed: Oct. 17, 2005

(65) Prior Publication Data

US 2006/0083982 A1    Apr. 20, 2006

(30) Foreign Application Priority Data

Oct. 18, 2004    (KR)    ................ 10-2004-0083269

(51) Int. Cl.
*H01M 2/00*    (2006.01)
*H01M 2/02*    (2006.01)
(52) U.S. Cl. ............... 429/163; 429/178; 429/179
(58) Field of Classification Search ............... None
See application file for complete search history.

(56) References Cited

U.S. PATENT DOCUMENTS

2002/0071986 A1 *    6/2002    Exnar .................. 429/94

FOREIGN PATENT DOCUMENTS

WO    WO 03/069698         8/2003
WO    WO 03/069698 A1 *    8/2003

\* cited by examiner

*Primary Examiner*—Dah-Wei D Yuan
*Assistant Examiner*—Adam A Arciero
(74) *Attorney, Agent, or Firm*—Robert E. Bushnell, Esq.

(57) ABSTRACT

A lithium ion secondary battery includes: an electrode assembly having first electrodes, second electrodes, and separators interposed between each of the first electrodes and each of the second electrodes; a can containing the electrode assembly; a cap assembly having a cap plate and a first electrode terminal having a first polarity insulated from the cap plate, the cap assembly covering a top opening of the can; and a battery accessory mounted on the cap assembly. At least one protrusion is provided on an upper surface of the cap plate, and the protrusion is combined in a complementary manner with a corresponding member of the battery accessory. As a result, it is possible to easily engage the battery accessories with the bare cell, and to easily perform subsequent processes using the complementary engagement.

16 Claims, 7 Drawing Sheets

LITHIUM ION SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 18 Oct. 2004 and there duly assigned Serial No. 10-2004-0083269.

BACKGROUND OF THE INVENTION

1. Technical Field

The present invention relates to a lithium ion secondary battery and, more particularly, to a lithium ion secondary battery having separate battery accessories coupled on a cap plate of a bare cell.

2. Related Art

Typically, secondary batteries can be charged/discharged numerous times in comparison with conventional primary batteries that cannot be charged. Currently, Ni-MH batteries, Li batteries, and Li-ion batteries are usually adopted as a secondary battery.

The secondary battery can be classified into a liquid electrolyte battery and a polymer electrolyte battery based on the electrolyte used in the battery. In the art, a battery using liquid electrolyte is called a lithium ion battery, and a battery using polymer electrolyte is called a lithium polymer battery. In addition, the lithium ion battery has been manufactured in various shapes, such as cylindrical, rectangular, and pouch shapes.

Flammability of the lithium secondary battery has been reduced by using a carbon based electrode instead of metal. However, safety has been still important in the manufacturing process of the lithium secondary battery because of the flammability of anhydrous electrolyte and the high energy density of the lithium.

Furthermore, in the lithium secondary battery, when overdischarge happens, battery components such as a negative electrode charge collector are damaged so that the battery becomes no longer rechargeable. Therefore, atypical lithium secondary battery is manufactured by combining a bare cell having a basic battery structure for charge/discharge operations and a protection circuit or unit for preventing overcharging, overdischarge, overheating, or overcurrent. The protection circuit or unit may be physically and electrically connected to the bare cell in the shape of a printed circuit board or an accessory at a side surface, upper surface or lower surface of the bare cell.

When a cylindrical canned battery is used, the cap assembly of the bare cell naturally has a function of preventing overheating or overcurrent. However, when a rectangular canned battery is used, the cap plate does not have such a safety function. Therefore, in the rectangular can, the bare cell and a separate safety device must be used together. In recent years, the safety device or unit, such as a protection circuit board in the rectangular can, is frequently mounted on an upper surface of the cap plate.

On the other hand, when a packaged battery in which a plurality of bare cells are combined with one another is used, an additional accessory, such as a cap cover, may be provided on the cap plate in order to connect the bare cells with one another in the package, or to connect a protection circuit to them. In this case, the cap cover itself does not provide a safety function, but it is just an accessory for electrically connecting components which can be formed in various shapes according to the interconnection of the bare cells. A peripheral region of the cap cover is usually made of a resin material so as to provide a support or a mount that makes contact with the bare cell. In the center of the cap cover, metallic terminals connected to the electrode terminals of the bare cells and the protection circuit, and a conductive interconnection for connecting the metallic terminals, maybe provided. Otherwise, the metallic terminal may be formed in a wider area without a separate interconnection.

The protection circuit may not be directly provided in an upper portion of the cap assembly. Instead, the protection circuit may be provided on the cap assembly with battery accessories, such as a washer for preventing a lead line connected to the electrode terminal in an upper portion of the cap assembly from making contact with the cap plate in other portions.

However, in the cap assembly forming an upper portion of the rectangular can, electrode terminals which are electrically separated from the cap plate extend from the upper surface of the cap plate. Accordingly, it is difficult to safely combine battery accessory assemblies with the cap assembly, for example, by robustly mounting a battery accessory assembly on the cap assembly or temporarily place the assembly and then welding it. Furthermore, since there is no means for guiding correct positions of the battery accessories around the cap assembly, it is not easy to place the accessories in their correct positions. If the accessories are not placed in their correct positions, the electrical connection between accessories and the bare cells may also be unstable. In this case, if the accessories are temporarily attached to the cap plate and then fixed by, for example, adhesion or welding, electrical connection between them may also be unstable and dangerous.

Conventionally, there have been difficulties in manufacturing the package battery because, for example, it has been difficult to fix the cap cover despite the fact that the cap cover should be fixed on an upper portion of the cap plate of the bare cell when the cap cover is used in the packaged battery.

Also, there is no part for stabilizing a washer when the washer is installed in on the cap plate, and the washer may be easily removed from the upper portion of the cap assembly by an external impact.

SUMMARY OF THE INVENTION

The present invention has been developed to alleviate the aforementioned problems, and an object of the present is to provide a lithium ion secondary battery having a structure for safely mount battery accessories on an upper portion of a cap plate.

According to an aspect of the present invention, there is provided a lithium ion secondary battery, comprising: an electrode assembly having a first electrode, a second electrode, and a separator interposed between the first electrode and the second electrode; a can containing the electrode assembly; a cap assembly having a cap plate and a first electrode terminal having a first polarity and insulated from the cap plate, the cap assembly covering a top opening of the can; and a battery accessory mounted on the cap assembly; wherein at least a step structure is provided on an upper surface of the cap plate, the step structure being combined in a complementary manner with a corresponding step member of the battery accessory.

For example, if a hollow is formed on an upper surface of the cap plate, a protrusion is formed on a lower surface of the battery accessory. Similarly, if a protrusion is formed in the center of an upper surface of the cap plate, a corresponding protruding member which can be engaged with the protrusion of the cap plate is formed on a lower surface of the battery accessory, and the step structure of the cap plate and the corresponding step member of the battery accessory provide a complementary engagement so that it is possible to prevent the battery accessory from being easily separated from the cap plate, even when an external horizontal impact is applied.

For example, when a hollow is formed on an upper surface of the cap plate and a protrusion which can be closely engaged with the hollow is formed on a corresponding lower surface of the battery accessory, it is possible to prevent the battery accessory from being easily separated from the cap plate, even when an external horizontal or vertical impact is applied.

It should be noted that the battery accessory may be an insulation washer, a cap cover, or a protection circuit module According to the present invention, the step structure on the cap plate maybe a hollow or a protrusion, and its position and size may be variously changed according to the corresponding battery accessory. The height of the step structure may be 10% to 50% of the thickness of the cap plate. For example, if the thickness of the cap plate is 0.8 mm, the height of the protrusion may be 0.1 to 0.4 mm. If the height is too small, the protrusion of the cap plate is loosely engaged with the battery accessory. Conversely, if the height is too large, it would be difficult to form the protrusion on the cap plate. In addition, when the engagement is a hollow, as the depth of the hollow becomes deeper, the corresponding thickness of the cap plate becomes narrower. As a result, the cap plate can be easily damaged or deteriorated near the hollow.

A molding process, a stamping process, or a casting or die-casting process can be used to form the step structure when the cap plate is formed. In the stamping process, it is possible to form a small protrusion on only an upper surface. In the stamping process, a protrusion is formed on the upper surface of the cap plate and a corresponding hollow is formed on the lower surface of the cap plate, so that the cross-section of the protrusion can conform thereto.

On the other hand, in the casting process, a protrusion having a rib shape may be formed on the upper surface of the cap plate, and a lower surface of the cap plate may be planar. The step structure which can be engaged with the corresponding member of the battery accessory may be formed by an adhesion method or a welding method.

In addition, according to the present invention, the battery accessory will seldom be separated from the cap plate when the protrusion is large and the corners of the protrusion are in conformity without a chamber.

According to another aspect of the present invention, there is provided a lithium ion secondary battery, comprising: an electrode assembly having a first electrode, a second electrode and a separator interposed between the first electrode and the second electrode; a can containing the electrode assembly; and a cap assembly having a cap plate and an electrode terminal provided at a through-hole of the cap plate and insulated from the cap plate; wherein at least one step structure is provided on an upper surface of the cap plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
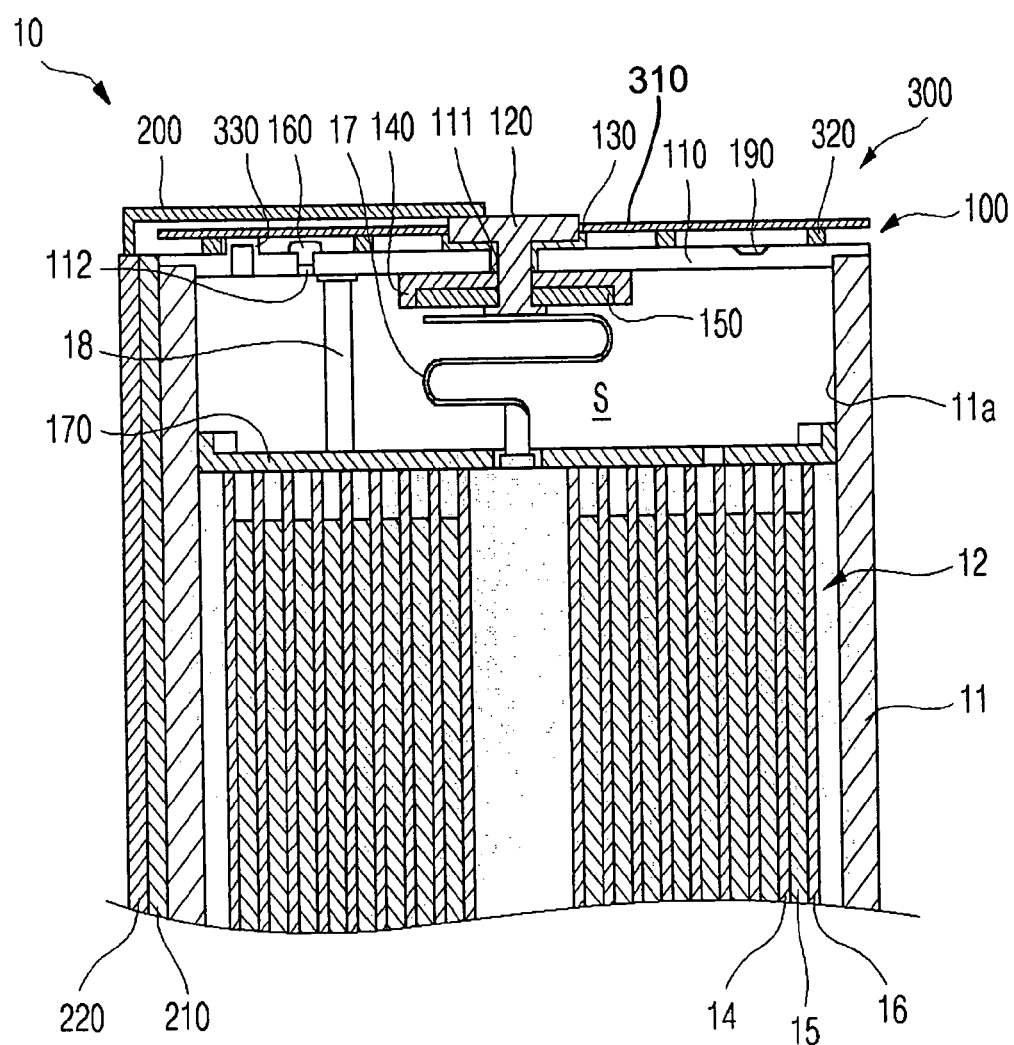
FIG. 1 is a cross-sectional view illustrating part of a lithium ion secondary battery according to the present invention.

Hereinafter, exemplary embodiments of the present invention will be described in detail with reference to accompanying drawings, in which like reference numerals denote like elements.

FIG. 1 is a cross-sectional view illustrating part of a lithium ion secondary battery according to the present invention.

Referring to FIG. 1, a lithium ion secondary battery 10 comprises: a can 11; an electrode assembly 12 stored in the can 1; a cap assembly 100 connected to a top opening of the can 11 and including a cap plate 110; and a protection circuit module 220. Also, a lead 200 for electrically connecting electrode terminals to the protection circuit module 220 is provided. In the cap plate 110 of the cap assembly 100, a protrusion 330 is formed. In addition, a washer 300 is disposed on the cap plate 110.

In the electrode assembly 12, there are a first electrode 14, a second electrode 16, and a separator 15 interposed between them. The first electrode 14 is electrically connected to the cap plate 110 through a first electrode tap 18, and the second electrode 16 is electrically connected to a second electrode terminal 120 formed in the cap plate 110 through a second electrode tap 17. The second electrode terminal 120 is insulated from the cap plate by a gasket 130 and an insulation film 140. Therefore, the can 11 is electrically insulated from the second electrode terminal 120 so as to function as a first electrode terminal.

The can 11 may be formed of metal, aluminum, or an aluminum alloy. The can 11 also functions as a container for containing the electrode assembly 12 having the first electrode 14, the second electrode 16, and the separator 15. After the electrode assembly 12 is inserted into the can 11 through the top opening of the can 11, the top opening is encapsulated by the cap assembly 100.

The cap assembly 100 is provided with the cap plate 110 which is flat and has a size and a shape corresponding to those of the top opening of the can 11. In the center of the cap plate 110, a through-hole 111 is provided to allow an electrode terminal to pass through it. In an outer side of the second electrode terminal 120 passing through the center of the cap plate 110, a gasket 130 having a tubular shape is provided to allow the second electrode terminal 120 to be electrically insulated from the cap plate 110. On a lower surface of the cap plate 110, an insulation plate 140 is disposed around the through-hole 111. On a lower surface of the insulation plate 140, a terminal plate 150 electrically connected to the first electrode terminal 120 is provided.

In addition, in the cap plate 110, a relief valve 190 is provided so as to vent excessive inner gas pressure, and an electrolyte injection hole 112 is formed in one side to provide a path for injecting electrolyte into the can 11. The electrolyte injection hole 112 is sealed with an electrolyte inlet plug 160.

Also, in the cap plate 110, a protrusion 330 for safely fixing the washer 300 is formed. The protrusion 330 is engaged with a step member of the washer 300 so as to prevent the washer from being removed, and it improves the safety of the battery by keeping the distance between the washer 300 and the electrolyte inlet plug 160 at a predetermined interval. Moreover, in the cap plate 110, the tubular gasket 130 protrudes from the upper surface of the cap plate 110 so as to insulate the second electrode terminal 120 from the cap plate 110.

The second electrode terminal 120 is connected to the lead 200, and the lead 200 is soldered to the protection circuit module 220 so that the second electrode terminal 120 is electrically connected to the protection circuit module 220. The protection circuit module 220 controls overcharged voltages and currents, overdischarged voltages and currents, or a short circuit in the electrode assembly 11, and is mounted on a predetermined area of the can 11 in the lithium ion secondary battery.

The washer 300 is formed of an insulation material in order to insulate the cap plate 110 from the lead 200, and includes a plate 310 and supports 320 attached on a lower surface of the plate 310. The supports 320 may be formed at a predetermined interval, and a resilient material such as a sponge can be used for the supports 320. Preferably, the supports 320 are formed to have a complementary structure with respect to the protrusions 330 on the cap plate 110. The supports 320 are combined in a complementary manner with the protrusions 330 so that the protrusions 330 adjacent to the washer plate 310 function as a support for the washer 300, even when an external pressure is applied, and prevent the washer 300 from being removed from an installation position.

Figure 2:
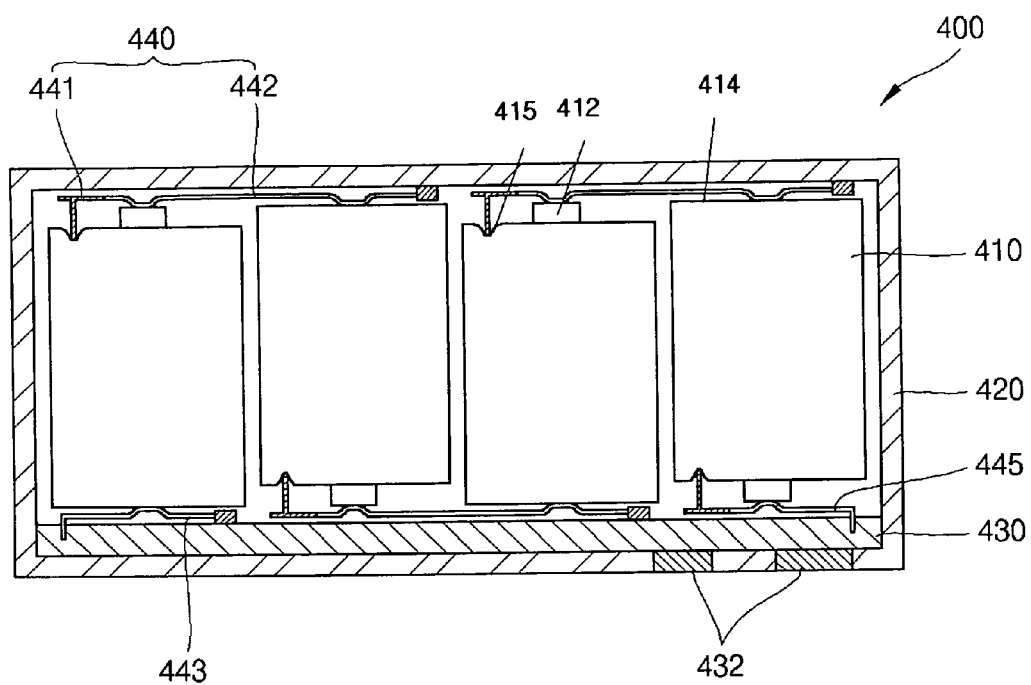
FIG. 2 is a top plan sectional view illustrating a state in which bare cells are connected to one another in a battery package having a plurality of bare cells.

FIG. 2 is a top plan sectional view illustrating a state in which bare cells are connected to one another in a battery package having a plurality of bare cells. It is noted that the cross-sections are shown for only the cap plate and the cap cover.

Referring to FIG. 2, one side of the corresponding metallic terminal 442 of the cap cover 440 makes contact with the electrode terminal 412 protruding from the cap plate plane of the bare cell 410. A support 441 may be formed by, for example, a plastic molding around the side of the metallic terminal 442 of the cap cover 440. The support 441 of the cap cover 440 is combined in a complementary manner with a hollow concave on the cap plate. If the plastic molded support 441 of the cap cover 440 forms a protrusion, the cap plate is provided with a hollow 415 for accepting the protrusion. If the cap cover 440 is combined in a complementary manner with the bare cell assembly 410, the one side of the metallic terminal 442 of the cap cover can be welded to the electrode terminal of the cap plate while their positions are maintained stable.

The other side of the metallic terminal 442 of the cap cover 440 may be combined with the lower surfaces of other adjacent bare cells or a portion of the cap plate for a serial interconnection of the bare cells 410 by a contact or welding process. In this case, one side of the metallic terminal 442 of the cap cover 440 connected to the electrode terminal of the bare cell 410 and the other side of the metallic terminal 442 of the cap cover 440 connected to one of the lower surfaces of the adjacent bare cells 410 are combined in a single body, and are directly connected with each other.

One side of the metallic terminal 442 of the cap cover 440 of those disposed at both end positions of the bare cells 410 contained in the package battery 440 may be connected to the protection circuit module 430 of the battery package 400 according to the structure of the battery package 400 using, for example, a welding process. In the battery package 400, the bare cells 410 and the protection circuit module 430 are installed in an external case 420, and external terminals are extracted to the exterior of the battery package 400 via a through-hole provided in the external case 420.

Since the complementary structure between the cap cover and the cap plate allows easy engagement as described above, a process of combining the cap cover 440 and the bare cell 410 may be easily and quickly performed. In addition, it may allow a subsequent process, for example, a welding process, to be easily and quickly performed. Furthermore, even after packaging the battery, it allows the interconnection of the bare cells 410 using the cap cover 440 in the battery package 400 to be more stable.

Although not shown in the drawing, a metallic terminal may be provided in the installation positions of the bare cells of the battery package 400 instead of carrying out a welding process between the cap cover 440 and the bare cells 410. In this case, if the metallic terminal itself, or a plastic molding portion around the metallic terminal, has a complementary structure with respect to the cap plate of the bare cell 410, it allows the bare cells 410 to be easily inserted into correct positions when the bare cells 410 are installed in the battery package 400. In addition, the complementary structure allows for the bare cells 410 not to be removed from correct positions in the battery package 400, even when an external impact is applied after the bare cells 410 are installed in the battery package 400 so as to guarantee a safe engagement condition.

Figure 3A:
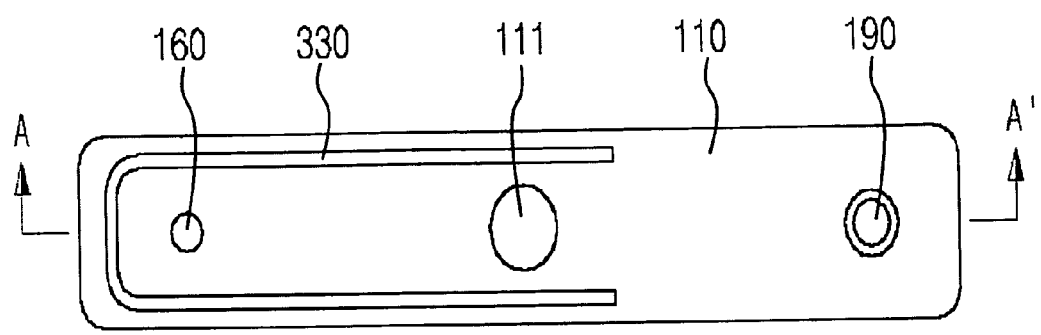
FIG. 3A is a top plan view illustrating a cap plate according to a first embodiment of the present invention.
Figure 3B:
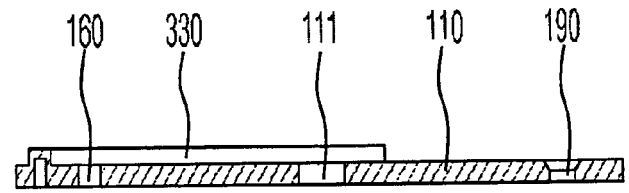
FIG. 3B is a cross-sectional view illustrating a cap plate according to a first embodiment of the present invention.

FIG. 3A is a top plan view illustrating a cap plate according to a first embodiment of the present invention; FIG. 3B is a cross-sectional view illustrating a cap plate according to a first embodiment of the present invention; and FIG. 4 is an exploded perspective view illustrating that a bare cell battery, according to a first embodiment of the present invention, is combined with a protection circuit assembly.

Referring to FIG. 3A, a cap plate 110 according to the present invention includes a protrusion 330, which has a U-shape, extending around an outer side of the cap plate 110. Referring to FIG. 3B, the protrusion 330 may be formed by a stamping process.

Figure 4:
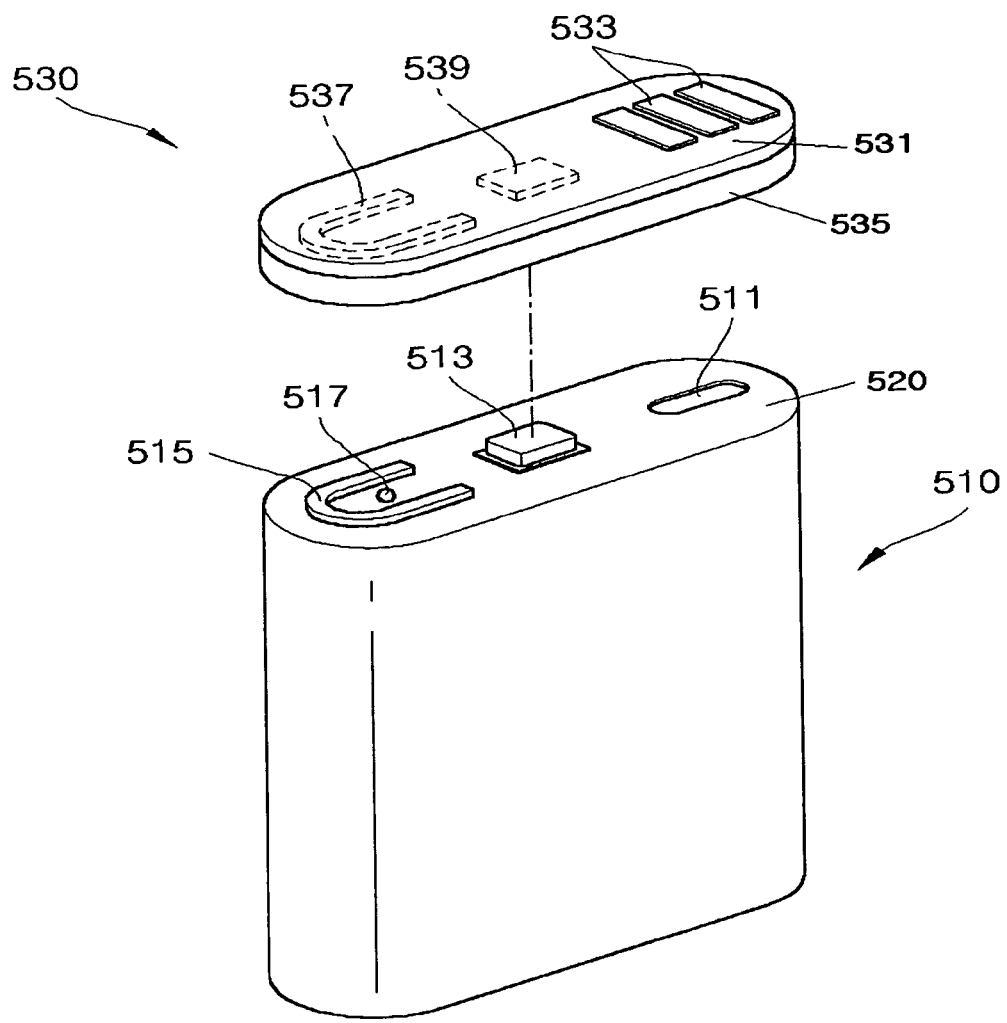
FIG. 4 is an exploded perspective view illustrating that a bare cell battery, according to a first embodiment of the present invention, is combined with a protection circuit assembly.

Referring to FIG. 4, a protection circuit module 530 is provided as an accessory of the battery. The protection circuit module 530 includes on its lower surface a U-shaped rib 537 corresponding to the U-shaped protrusion 515 of the cap plate 520 of the cap plate 520 while having a smaller size than the U-shaped protrusion 515. The U-shaped rib 537 engages with the U-shaped protrusion 515 as a complementary structure. In this case, such a complementary structure according to the present invention provides a space between the battery accessories installed on the cap plate 520 and the electrolyte injection hole 517 or the relief valve 511, and allows battery accessories, such as protection circuit module 530, to be safely mounted on the cap plate 520. The protection circuit module 530 may be a plastic molding product in which a protection circuit board is embedded. In the protection circuit module 530, a positive electrode terminal formed by the U-shaped rib 537 may be provided on a lower surface of the planar body 531 of the protection circuit module 530, and a plastic skirt 535 may be provided along its edge.

The installation position of the negative electrode terminal 539 of the protection circuit module 530 connected to the negative electrode terminal 513 protruding from the cap plate 520 of the bare cell 510 may be determined based on the heights of the U-shaped protrusion 515, the U-shaped rib 537, and the edge skirt 535. By way of example, a plate type negative electrode terminal 539 may be formed in the center of the lower surface of the planar body 531 of the protection circuit module 530, while the heights of the negative electrode terminal formed by the U-shaped rib 537, the U-shaped protrusion 515 of the cap plate 520, and the edge skirt 535 are designed so as to be equal to the height of the negative electrode terminal 513 of the bare cell 510 from the cap plate 520. Contact portions of the U-shaped protrusion 515 and the negative electrode terminal 513 of the bare cell 510 with the protection circuit module 530, for example, an inside surface of the protrusion, may be coated or plated with silver. Otherwise, a conductive adhesive, such as a silver paste, may be applied to them so as to reduce contact resistance. Then, the cap plate 520 of the bare cell 510 is bonded with the protection circuit module 530 by applying a strong adhesive to the edge skirt 535 of the protection circuit module 530. Through the aforementioned bonding process between the protection circuit module 530 and the bare cell 510, it is possible to manufacture a package battery having a simple structure. Of course, an exterior (not shown) may be applied by a tubing process to the resultant assembly in which the protection circuit module 530 and the bare cell 510 are bonded to each other.

Figure 5A:
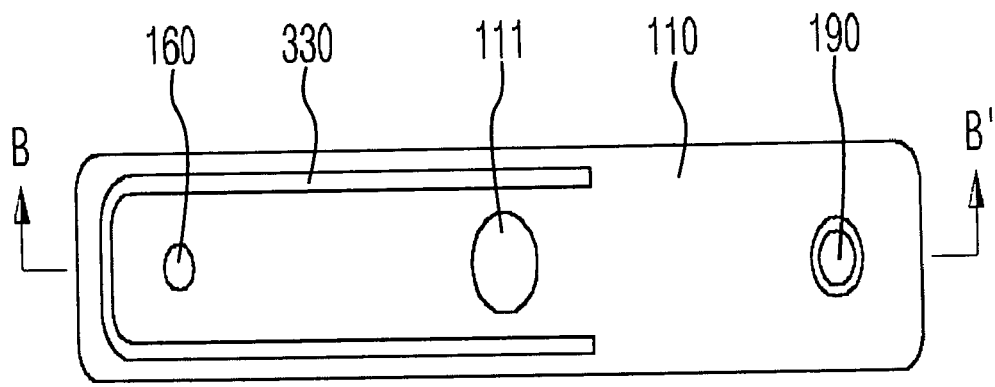
FIG. 5A is a top plan view illustrating a cap plate according to a second embodiment of the present invention.
Figure 5B:
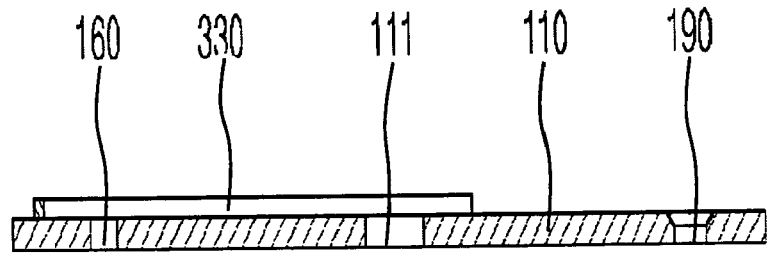
FIG. 5B is a cross-sectional view illustrating a cap plate according to a second embodiment of the present invention.

FIG. 5A is a top plan view illustrating a cap plate according to a second embodiment of the present invention; and FIG. 5B is a cross-sectional view illustrating a cap plate according to a second embodiment of the present invention.

Referring to FIGS. 5A and 3A, the U-shaped protrusion 330 protruding from the outer surface of the cap plate 110 is provided on the upper surface of the cap plate 110 not using a stamping or press method, but rather using an adhesive method. As a result, it is possible to more easily form the protrusion 330 by applying an adhesive to fix a protrusion member on the upper surface of the cap plate 110.

Figure 6:
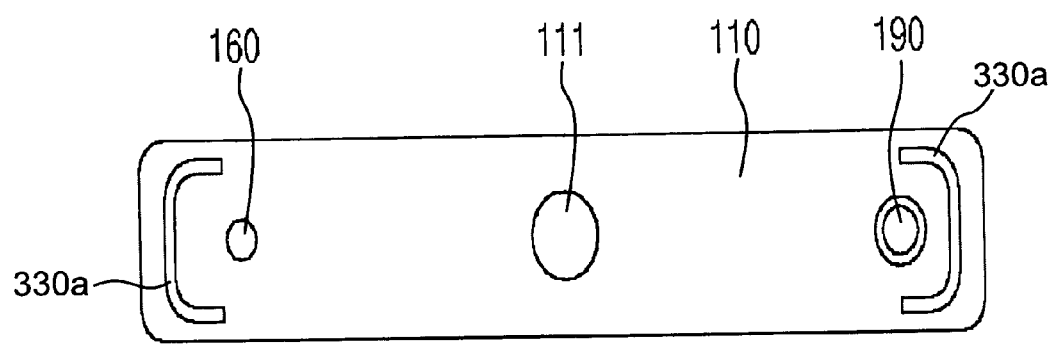
FIG. 6 is a top plan view illustrating a cap plate according to a third embodiment of the present invention.

FIG. 6 is a top plan view illustrating a cap plate according to a third embodiment of the present invention.

Referring to FIG. 6, the protrusions 330a having a short U-shape are provided on both short sides of the rectangular plane of the cap plate 110. The protrusions 330a protrude from the rectangular plane of the cap plate 110 so as to allow battery accessories to be safely attached to the cap assembly 100 in their matching positions.

Figure 7:
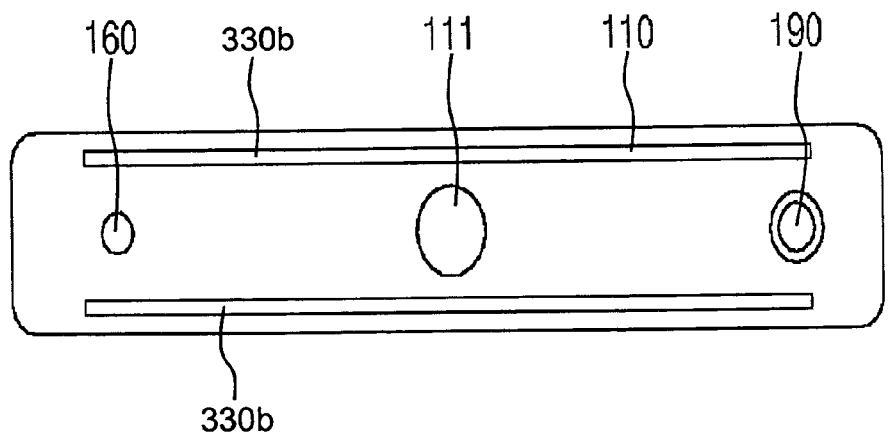
FIG. 7 is a top plan view illustrating a cap plate according to a fourth embodiment of the present invention.

FIG. 7 is a top plan view illustrating a cap plate according to a fourth embodiment of the present invention.

Referring to FIG. 7, protrusions 330b having a linear shape are provided on both long sides of the rectangular plane of the cap plate 110. Since the protrusions 330b according to the fourth embodiment are provided on long sides, battery accessories can be more safely attached to the cap plate 110 in their matching positions.

Figure 8:
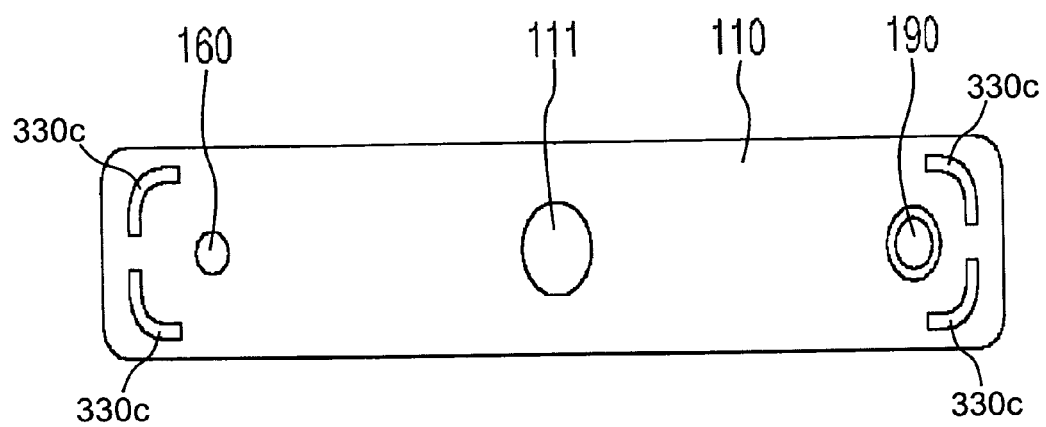
FIG. 8 is a top plan view illustrating a cap plate according to fifth embodiment of the present invention.

FIG. 8 is a top plan view illustrating a cap plate according to fifth embodiment of the present invention.

Referring to FIG. 8, four separate protrusions 330c are provided on four corners of the rectangular plane of the cap plate 110.

In the aforementioned embodiments, it should be noted that the protrusions 330, 330a-330c on the cap plate 110 may be formed by a stamping method or an adhesive method in which members having a predetermined shape are bonded using an adhesive. The protrusions 330, 330a-330c form a space between the battery accessories and the electrolyte injection hole 160 formed on the cap plate 110. Therefore, it is possible to prevent a problem relating to leakage of the electrolyte when excessive pressure is applied to the electrolyte injection hole 160.

According to the present invention, a complementary structure is provided between the cap plate 110 and the battery accessories mounted on the cap plate 110 of the bare cell. As a result, it is possible to easily engage the battery accessories with the bare cell, and to easily perform subsequent processes using the complementary engagement.

Also, it is possible to guarantee a safe engagement between the battery accessories and the bare cell. As a result, it is possible to prevent a short circuit or a bad electrical interconnection caused by external impact.

While the present invention has been particularly shown and described with reference to exemplary embodiments thereof, it will be understood by those skilled in the art that various changes in form and detail may be made therein without departing from the spirit and scope of the invention as defined by the appended claims. Therefore, the scope of the invention is defined by the appended claims, and all differences within the scope will be construed as being included in the present invention.

What is claimed is:

1. A lithium ion secondary battery, comprising:
   an electrode assembly having a first electrode, a second electrode, and a separator interposed between the first electrode and the second electrode;
   a can containing the electrode assembly;
   a cap assembly having a cap plate and a first electrode terminal having a first polarity and insulated from the cap plate, the cap assembly covering a top opening of the can; and
   a battery accessory mounted on the cap assembly;
   wherein at least one step structure is provided on an upper surface of the cap plate, said at least one step structure being combined in a complementary manner with a corresponding step member of the battery accessory; and
   wherein said at least one step structure is formed by a stamping process in a conforming shape so that a complementary step structure is also provided on a lower surface of the cap plate.

2. The lithium ion secondary battery according to claim 1, wherein said at least one step structure protrudes from an upper surface of the cap plate with a height the same as a height of the first electrode terminal.

3. The lithium ion secondary battery according to claim 1, wherein said at least one step structure functions as a second electrode terminal having a second polarity, and is electrically connected to the corresponding step member of the battery accessory.

4. The lithium ion secondary battery according to claim 3, further comprising an intermediate layer for reducing contact resistance between said at least one step structure of the cap plate and the corresponding step member of the battery accessory.

5. The lithium ion secondary battery according to claim 1, wherein said at least one step structure has a U-shape and is formed on a peripheral region of the cap plate.

6. The lithium ion secondary battery according to claim 1, wherein step structure comprises two step structures having a U-shape and formed on respective short sides of a rectangular plane of the cap plate.

7. The lithium ion secondary battery according to claim 1, wherein said at least one step structure comprises two step structures having a linear shape and formed on respective long sides of a rectangular plane of the cap plate.

8. The lithium ion secondary battery according to claim 1, wherein said at least one step structure has an L-shape and is formed on at least one of four corners of a rectangular plane of the cap plate.

9. The lithium ion secondary battery according to claim 1, wherein the battery accessory comprises one of an insulation washer, a cap cover, and a protection circuit module.

10. A lithium ion secondary battery, comprising:
an electrode assembly having a first electrode, a second electrode, and a separator interposed between the first electrode and the second electrode;
a can containing the electrode assembly; and
a cap assembly having a cap plate and an electrode terminal provided at a through-hole of the cap plate and insulated from the cap plate;
wherein at least one step structure is provided on an upper surface of the cap plate; and
wherein said at least one step structure is formed by a stamping process in a conforming shape so that a complementary step structure is also provided on a lower surface of the cap plate.

11. The lithium ion secondary battery according to claim 10, wherein said at least one step structure protrudes from an upper surface of the cap plate with a height the same as a height of the first electrode terminal.

12. The lithium ion secondary battery according to claim 10, wherein said at least one step structure has a U-shape and is formed on a peripheral region of the cap plate.

13. The lithium ion secondary battery according to claim 10, wherein said at least one step structure comprises two step structures having a U-shape and formed on respective short sides of a rectangular plane of the cap plate.

14. The lithium ion secondary battery according to claim 10, wherein said at least one step structure comprises two step structures having a linear shape and formed on respective long sides of a rectangular plane of the cap plate.

15. The lithium ion secondary battery according to claim 10, wherein said at least one step structure has an L-shape and is formed on at least one of four corners of a rectangular plane of the cap plate.

16. A lithium ion secondary battery, comprising:
an electrode assembly having a first electrode, a second electrode, and a separator interposed between the first electrode and the second electrode;
a can containing the electrode assembly;
a cap assembly having a cap plate and an electrode terminal provided at a through-hole of the cap plate and insulated from the cap plate; and
a battery accessory mounted on the cap assembly and having a corresponding step member;
wherein at least one step structure is provided on an upper surface of the cap plate; and
wherein said at least one step structure functions as a second electrode terminal having a second polarity, and is electrically connected to the corresponding step member of the battery accessory.

* * * * *

UNITED STATES PATENT AND TRADEMARK OFFICE
CERTIFICATE OF CORRECTION

PATENT NO. : 7,592,096 B2  Page 1 of 1
APPLICATION NO. : 11/250619
DATED : September 22, 2009
INVENTOR(S) : Jung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Twenty-first Day of September, 2010

David J. Kappos
*Director of the United States Patent and Trademark Office*